United States Patent
Smierciak

[11] 3,815,465
[45] June 11, 1974

[54] BAND SAW
[75] Inventor: Walter R. Smierciak, Elgin, Ill.
[73] Assignee: Wilton Corporation, Schiller Park, Ill.
[22] Filed: Dec. 15, 1971
[21] Appl. No.: 208,180

[52] U.S. Cl.................... 83/820, 83/799, 83/812
[51] Int. Cl..................... B23d 53/04, B26d 1/54
[58] Field of Search............ 83/820, 799, 811, 812, 83/821, 829, 824

[56] References Cited
UNITED STATES PATENTS

| 291,492 | 1/1884 | Campbell | 83/820 |
|---|---|---|---|
| 502,887 | 8/1893 | Griffin | 83/820 X |
| 2,705,510 | 4/1955 | Stocke | 83/829 X |
| 2,928,439 | 5/1960 | Tester | 83/812 X |
| 3,452,629 | 7/1969 | Jacobson | 83/812 |
| 3,556,731 | 3/1971 | Ensley | 83/799 |
| 3,570,346 | 3/1971 | Koinzan | 83/799 X |
| R435 | 3/1857 | Hedge | 83/820 |

Primary Examiner—Granville Y. Custer, Jr.
Assistant Examiner—James F. Coan
Attorney, Agent, or Firm—Olson, Trexler, Wolters, Bushnell & Fosse, Ltd.

[57] ABSTRACT

A metal cutting band saw is provided with guides for the cutting reach of the blade. With the band saw in upright position the guides hold the blade in the normal position, i.e., parallel to the axes of the rollers over which the blade passes. However, when the head of the band saw is tipped down to approximate a horizontal position, the guides are reset to twist the cutting reach of the blade on the order of 45° from its normal position to allow cutting of pieces which are too large otherwise to reach through the throat of the band saw.

2 Claims, 7 Drawing Figures

INVENTOR
WALTER R. SMIERCIAK

By Olson, Trexler, Walters & Bushnell
Attys

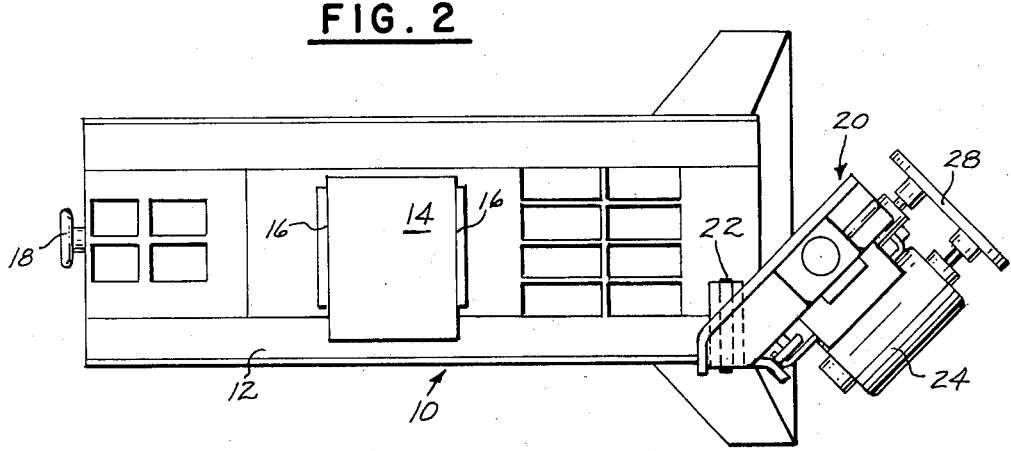
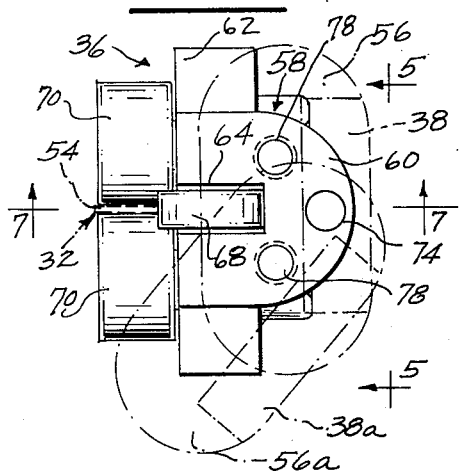
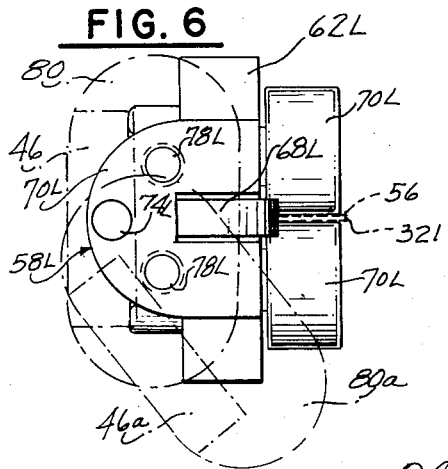
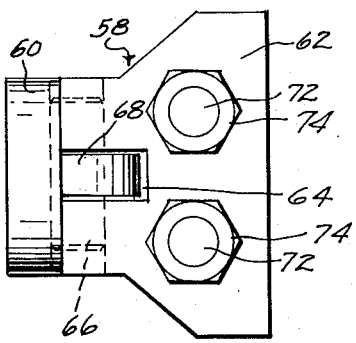
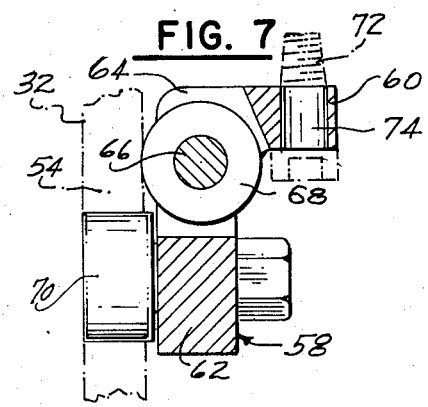
INVENTOR
WALTER R. SMIERCIAK

BAND SAW

BACKGROUND OF THE INVENTION

Band saws, commonly provided with hardened teeth, are often used for cutting off metal work pieces. When relatively small work pieces are to be cut off the band saw is operated with the head in a vertical position and the work pieces are simply passed through the throat of the head and are cut off, much as in the same manner as wood is cut in a band saw in a wood shop. However, there are other times when slices must be made from a relatively large work piece which will not fit through the throat, and which take a long time in cutting, thereby precluding hand feed. Accordingly, it is desirable to be able to tip the head of the band saw so that the weight thereof will press the blade down against the work piece for cutting off over an extended period of time. However, since such work pieces are often too large to fit through the throat, the head is mounted at an angle so that the back of the head never reaches the work piece, thereby providing, in essence a throat of infinite width. However, it will be apparent that in the upright position described the blade is in the normal position, i.e., with the cutting reach parallel to a plane through the axes of the two wheels or rollers carrying the band saw. Thus, when the head is tipped at an angle so that the back thereof is positioned above the work piece the blade must be twisted from its normal plane, and in the present example by about 45°.

Previous band saws adapted for purposes as heretofore described have been quite expensive, have been difficult to adjust, and have been prone to fracture blades in short order.

SUMMARY AND OBJECTS OF THE PRESENT INVENTION

In accordance with the present invention a band saw is provided with a massive base and with a head pivotally connected thereto for pivoting between vertical, upright position, and lowered, substantially horizontal position. The plane of the head is twisted approximately 45° from the pivotal connection to the base, and in vertical position the blade is guided by adjustable guides in its normal plane, i.e., parallel to a plane through the axes of the wheels or rollers over which the blade passes. However, when the head is tipped down toward horizontal guides are adjusted to twist the blade in the cutting reach by approximately 45° so that the blade is in a vertical plane.

The object of the present invention is to provide a superior band saw of the nature described, and particularly to provide improved guides for the cutting reach of the blade.

SUMMARY OF THE DRAWINGS AND DETAILED DESCRIPTION

The invention will best be understood with reference to the following specification when taken in connection with the accompanying drawings wherein:

FIG. 2 is a top view thereof;

FIG. 4 is a detail horizontal view of the upper blade guide in horizontal view as taken substantially along the lines 4—4 in FIG. 1;

FIG. 5 is a right end view as taken substantially along the lines 5—5 in FIG. 4;

FIG. 6 is an upwardly looking detail horizontal view as taken substantially along the lines 6—6 in FIG. 1; and FIG. 7 is a vertical cross-sectional view as taken substantially along the lines 7—7 in FIG. 4.

Figures 1, 3:
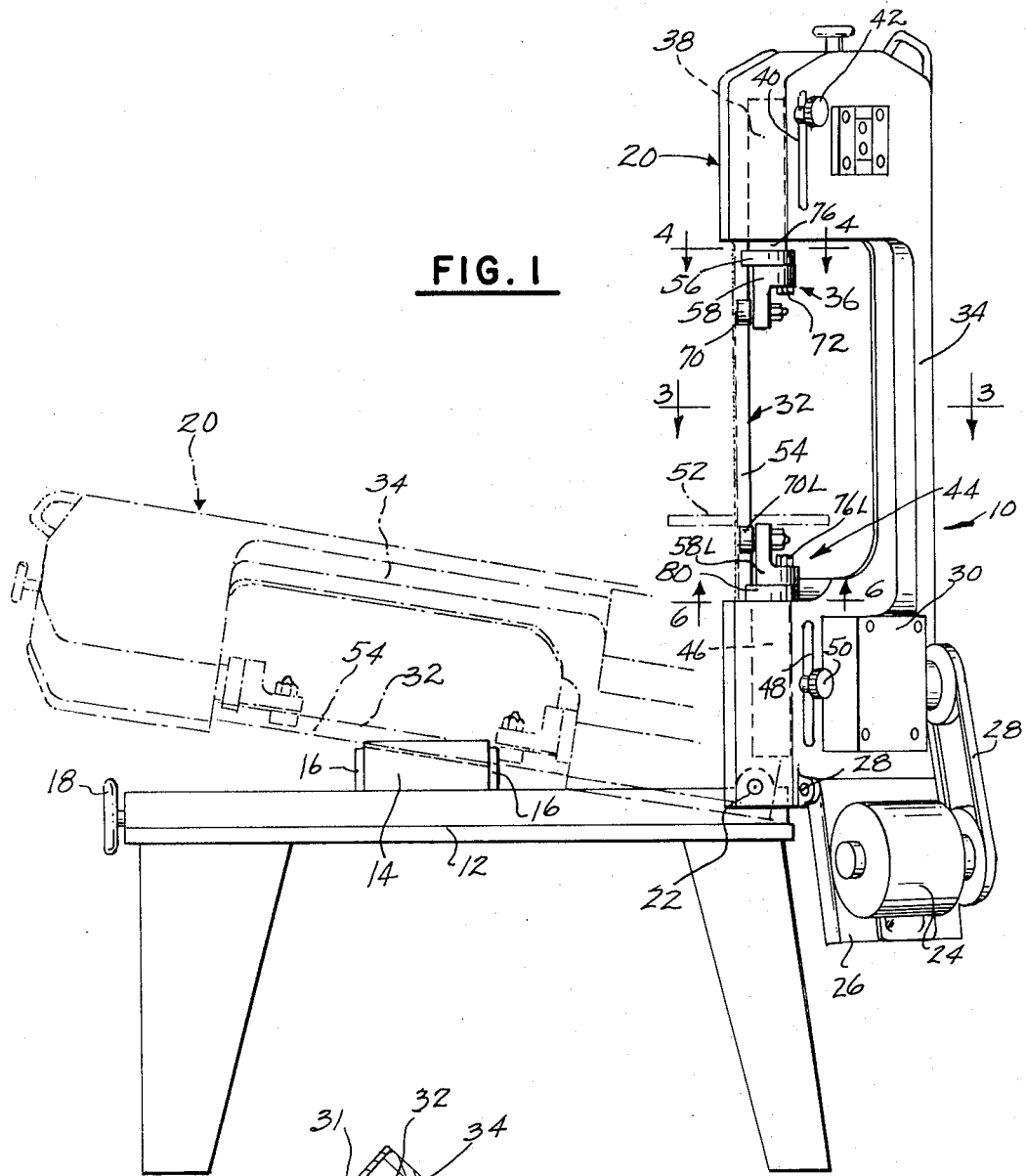
FIG. 1 is a vertical elevational or front view of a band saw constructed in accordance with the present invention.
FIG. 3 is a detail horizontal view partly in section on an enlarged scale as taken substantially along the lines 3—3 in FIG. 1.

Returning now in greater particularity to the drawings, and first to FIGS. 1 and 2, there will be seen a band saw 10 comprising a base or pedestal 12 of generally conventional construction. A work piece 14 is shown as supported on the pedestal, and this preferably is held in place by a clamp mechanism 16 including a hand wheel 18 for adjusting the clamping action.

A head 20 is shown in upright position in solid lines, and in FIG. 1 is also shown in broken lines in substantially horizontal position. The head is pivotally mounted on the base by means of pivot pin 22, and it will be noted particularly in FIG. 2 that the head is skewed at an angle at approximately 45° from the axial length of the pivot pin. The head is provided with an electric motor 24 on a depending motor plate 26 pivotally connected to the head at 28. The weight of the motor is below the pivot pin 22 with the head in vertical upright position, and in most instances this will be sufficient to hold the head in upright position. However, additional locking means (not shown) may be provided for positively holding the head in upright position. The motor 24 acts through pulleys and a belt 28 to drive a gear reducer and right angle drive structure 30 which in turn drives the driven roller or wheel 31 (FIG. 3) over which the band saw blade 32 is passed. An upper portion of the head 20 rotatably supports an idler wheel or roller (not shown) in accordance with conventional practice. An upright backbone 34 on the head provides the usual throat adjacent the cutting blade 32, and also houses the inactive reach of the blade.

An upper guide assembly 36 is adjacent the top portion of the head and has an upstanding stem 38 with a threaded stud (now shown) extending therefrom through a vertical slot 40 in the head. A knurled nut 42 is threaded on this stud for clamping against the surface of the top portion of the head, and thereby to provide for vertical up and down adjustment of the upper bearing guide assembly 36.

Below and aligned with the upper bearing guide assembly is a lower blade or bearing guide assembly 44 which likewise has a vertical stem 46, this stem extending down as opposed to the upward extension of the upper stem 38. A threaded stud (not shown) is fixed in the stem 46 and extends through a vertical slot 48 in a lower portion of the head 20 and has a knurled nut 50 thereon for vertical adjustment of the lower guide assembly. A horizontal work supporting table 52 optionally is fixed at the top of the lower guide assembly 44 for supporting a work piece as it is cut by the working or cutting reach 54 of the blade. This table is removable, or may be omitted entirely, with support for a work piece being provided for a separate table.

The construction of the upper bearing guide assembly will be better understood with reference to FIGS. 4, 5 and 7 wherein the stem 38 previously referred to will be seen as having a horizontal mounting plate 56 (see also FIG. 1) at the bottom end thereof. In FIG. 4 the stem 38 and blade 56 are shown in a turned or twisted position, respectively indicated as 38a and 56a. It will be understood that these parts do not actually twist, but that this twisted position is shown as a point of reference for the remaining parts of the upper bearing guide assembly hereinafter to be described, it being easier to show these relatively simple parts in a twisted position than to show the more complex parts following hereinafter.

The upper guide assembly further includes a bearing bracket 58 having a base flange 60 and a vertical flange 62 integral therewith. The juncture between the two flanges is slotted at 64 and a crosspin 66 therein rotatably mounts a backup roller 68 which rollingly engages and backs up the back (i.e., non-toothed) edge of the cutting reach 54 of the blade 32. A pair of spaced rollers 70 is journalled on a similar pair of studs 72 secured by nuts 74 on the vertical flange 62 of the bracket 68. As will be seen in FIG. 4 the cutting reach 54 of the blade 32 passes closely between the pair of rollers 70.

The mounting flange 60 is secured to the mounting plate 56 by means of threaded studs. A single stud 72 (which may have a recess in the head thereof for driving) extends up through a suitable hole 74 in the flange 60 and engages in a threaded hole in the plate 56. Conversely, a pair of like threaded studs 76 (FIG. 1) extends down through suitable holes in the plate 56 and is threaded into tapped holes 78 in the flange 60. The three aforesaid threaded holes (not the non-threaded holes) are duplicated in an appropriate offset position so that the bracket 36 may be positioned in square relationship to the plate 56, or may be twisted approximately 45° (in actual practice, 40°) relative to the plate as shown in connection with the broken line position 56a of the plate in FIG. 4, whereby to twist the cutting reach 54 of the blade 32 by the requisite angle.

The construction of the lower guide assembly is generally similar to the upper guide assembly but in inverse relationship thereto, and the description therefore need not be so detailed. Indeed, the structure may be identical, and the vertically adjustable stem 46 is provided with a horizontal mounting plate 80 in mirror image relationship to the plate 56 and stem 38. A suffix a again is provided to show the twisted or turned position, it again being understood that it is the bracket and parts mounted thereon that turn, rather than the stem and mounting plate. Since the bracket, etc., is substantially identical with that of the upper guide assembly, further description at this point is obviated by utilizing similar numerals with the addition of the suffix L to distinguish the lower assembly from the upper.

As will be understood, each of the brackets 58 and 58L could be mounted on its respective mounting plate by only a single threaded stud with smooth guide pins being used in smooth holes to insure the correct angular positioning. Furthermore, an arcuate tongue and groove arrangement could be made for pivoting the brackets on the respective mounting plates. The important thing is that the brackets, and hence the guide rollers 70L and 70 and the backup rollers 68L and 68 may be positioned with the head in upright position to guide the cutting reach 54 of the blade 32 in its normal position, i.e., parallel to a plane through the axes of the drive wheel and the idler wheel. On the other hand, the guide brackets 58 and 58L may be turned by 40° to twist the cutting reach 54 of the blade 32 40° from its normal position. Thus, when the head is lowered to nearly horizontal position, as shown in the broken line position of FIG. 1, the backbone 34 of the head is positioned entirely above the work piece 14 while the blade is in a vertical plane to slice portions off of the work piece 14 without interference from the backbone 34. Vertical adjustment of the stems 38 and 46 allows greater or lesser lengths of the cutting reach of the blade to be twisted, as may be required in any given installation or operation.

The specific example of the invention as herein shown and described is for illustrative purposes only. Various changes in structure will no doubt occur to those skilled in the art, and will be understood as forming a part of the present invention, insofar as they fall within the spirit and scope of the appended claims.

The invention is claimed as follows:

1. A band saw comprising a base, a head on said base, means tiltably mounting said head on said base for operation with the head in substantially vertical position or in substantially horizontal position, said head being skewed a predetermined angle relative to the pivotal mounting thereof on said base, a band saw blade on said head mounted on wheels having axes in a common plane on said head and having a cutting reach, and upper and lower guide means on said head for said blade cutting reach, each of said guide means including a mounting plate carried by the head and disposed transversely of the longitudinal extent of the blade cutting reach and a right angle bracket with a mounting flange pivotally adjustable in surface contact with the mounting plate and with a right angle flange projecting along the length of the blade cutting reach, a pair of rollers carried by the right angle flange and engageable with the opposite faces of said blade on the cutting reach thereof and a backup roller carried by the bracket and engageable with the back or non-tooth edge of said blade, and means for adjustably positioning said brackets about the pivotal mounting thereof to a corresponding mounting plate in either of two predetermined fixed positions bearing predetermined fixed relations to said skewed angle and to said common plane to hold the cutting reach of said blade in either of two predetermined planes twisted relative to one another, one of said predetermined planes being vertical with the head in substantially horizontal position, and the other of said predetermined planes being substantially parallel to the plane of said wheel axes with the head in substantially vertical position.

2. A band saw as set forth in claim 1 and further including stems adjustably mounted in said head and each carrying one of said mounting plates and providing means for vertically adjustably positioning said upper and lower guides on said head for varying the length of the cutting reach of the blade.

* * * * *